(12) United States Patent
Zhang et al.

(10) Patent No.: US 8,532,443 B2
(45) Date of Patent: Sep. 10, 2013

(54) INTEGRATED OPTICAL FIBER GYROSCOPE CHIP BASED ON SURFACE PLASMON POLARITON WAVEGUIDE

(75) Inventors: Tong Zhang, Nanjing (CN); Xiaojun Xue, Nanjing (CN); Pengqin Wu, Nanjing (CN); Xiaoyang Zhang, Nanjing (CN); Qiuyue Chen, Nanjing (CN)

(73) Assignee: Southeast University, Jiangsu (CN)

( * ) Notice: Subject to any disclaimer, the term of this patent is extended or adjusted under 35 U.S.C. 154(b) by 140 days.

(21) Appl. No.: 13/264,615

(22) PCT Filed: Sep. 23, 2009

(86) PCT No.: PCT/CN2009/074158
§ 371 (c)(1),
(2), (4) Date: Oct. 14, 2011

(87) PCT Pub. No.: WO2010/118601
PCT Pub. Date: Oct. 21, 2010

(65) Prior Publication Data
US 2012/0051691 A1 Mar. 1, 2012

(30) Foreign Application Priority Data

Apr. 15, 2009 (CN) .......................... 2009 1 0030785

(51) Int. Cl.
*G02B 6/12* (2006.01)
*G02B 6/10* (2006.01)
(52) U.S. Cl.
USPC ........................................... 385/14; 385/129
(58) Field of Classification Search
USPC .......................................................... 385/14
See application file for complete search history.

(56) References Cited

U.S. PATENT DOCUMENTS

2012/0051691 A1* 3/2012 Zhang et al. .................... 385/14

FOREIGN PATENT DOCUMENTS

| CN | 1648604 A | 8/2005 |
| CN | 1862228 A | 11/2006 |

(Continued)

OTHER PUBLICATIONS

International Search Report, dated Jan. 14, 2010, corresponding to PCT/CN2009/074158, 8 pages.

(Continued)

*Primary Examiner* — Rhonda Peace
(74) *Attorney, Agent, or Firm* — Christie, Parker & Hale, LLP

(57) ABSTRACT

An integrated optical fiber gyroscope chip based on surface Plasmon Polariton waveguide is an integrated optical fiber gyroscope chip in which optical signal is transmitted through the surface Plasmon Polariton waveguide and the polymer optical waveguide which are connected with each other, and it is used in the optical fiber gyroscope field. From the input end to the output end, the optical fiber gyroscope chip sequentially has: an input waveguide (1) and the third output waveguide (7), a directional coupler (2), a symmetrical triple waveguide splitter (3), the first output waveguide (61) and the second output waveguide (62), wherein the input waveguide (1), the first output waveguide (61), the second output waveguide (62) and the third output waveguide (7) are polymer optical waveguides, but the directional coupler (2) and the symmetrical triple waveguide splitter (3) are made from the surface Plasmon Polariton waveguide. The chip utilizes the transmission characteristics of the surface Plasmon Polariton waveguide to realize the single polarization of long-distance transmission of the optical signal, and directly modulates the surface Plasmon Polariton waveguide core layer, and removes influence of the leakage light to the precision of the fiber gyroscope through the specific structure.

3 Claims, 2 Drawing Sheets

(56) References Cited

FOREIGN PATENT DOCUMENTS

| | | |
|---|---|---|
| CN | 101294806 A | 10/2008 |
| CN | 101526354 A | 9/2009 |
| DE | 10 2007 031 841 A1 | 1/2009 |

OTHER PUBLICATIONS

Geng Fan, et al., "Integrated Optic Multifunction Chip Fabrication for Fiber Optic Gyroscope," Infrared and Laser Engineering, Feb. 1997, vol. 26, No. 1, pp. 54-56.

Zhao, et al., "A Novel Y-Branch Waveguide Based on Surface Plasmon Polaritons," Acta Optica Sinica, Sep. 2007, vol. 27, No. 9, pp. 1649-1652.

Zhao, et al., "Optical Directional Coupler Based on Surface Plasmon Polariton," Science in China (Series G: Physics; Mechanics & Astronomy), Feb. 2009, vol. 39, No. 2, pp. 191-195.

* cited by examiner

INTEGRATED OPTICAL FIBER GYROSCOPE CHIP BASED ON SURFACE PLASMON POLARITON WAVEGUIDE

CROSS-REFERENCE TO RELATED APPLICATION(S)

This application is a National Phase Patent Application and claims the priority to and benefit of International Application Number PCT/CN2009/074158, filed on Sep. 23, 2009, which claims priority of Chinese Patent Application Number 200910030785.6, filed on Apr. 15, 2009.

FIELD OF THE INVENTION

The present invention relates to the technical field of integrated optics and inertial sensing, in particular relates to an integrated optical fiber gyroscope chip based on the interconnection structure of surface plasmon polariton waveguide and polymer optical waveguide, and is applied in the field of optical fiber gyroscope.

BACKGROUND OF THE INVENTION

As a novel gyroscope, optical fiber gyroscope uses optical fiber as carrier for laser beam and utilizes Sagnac effect in a closed optical fiber loop to measure the rotational angular velocity of a rotating body. Since its emergence, optical fiber gyroscope has received general attention from universities and scientific research institutions in many countries in the world, thanks to its outstanding advantages, structural flexibility, and attractive prospect, and has achieved great progress in the last twenty years. As the demand for optical fiber gyroscope continuously increases, the requirements for miniaturization, integration, low cost, and high stability are put forth for optical fiber gyroscope.

At present, the integrated optical chips that are widely used in optical fiber gyroscope systems are integrated chips that are based on $LiNbO_3$ material. Since these integrated chips usually have Y branches of proton-exchanged $LiNbO_3$ optical waveguide, they are also called as Y-type waveguide integrated optical devices (multi-functional integrated optical chips (MFIOC) in foreign countries). Such a device integrates Y-type beam splitter, polarizer, and phase modulator in a same chip, and can be applied in closed-loop optical fiber gyroscopes with various accuracies. Though such integrated optical chips are the best in terms of practical application in integrated optical fiber gyroscopes, but they have the following drawbacks during application:

1. When the optical signal returns from the optical fiber coil and enters into a Y-shape waveguide, a part of the signal will leak and dissipate in the substrate, generates a leak pattern, and thereby affects the accuracy of optical fiber gyroscope.
2. The production method of $LiNbO_3$ optical waveguides is proton exchange method, which has strict requirements for proton exchange time, temperature, properties of the exchange medium, and annealing temperature and time. The process is complex and the cost is high;
3. Phase modulation must be performed for LiNbO3 optical waveguides. To that end, modulation electrodes must be prepared at two ends of optical waveguide by utilizing electro-optic effect. Therefore, the preparation process becomes more complex, and the modulation efficiency is not high.

In recent years, with the development of nano-science and nano-electronics, a brand-new waveguide structure, SPPs (Surface Plasmon Polaritons) waveguide, became a new research direction in the integrated optic field. SPP is a kind of non-radioactive electromagnetic wave that propagates on metal surface and is restrained thereon. SPP is restrained on the waveguide surface due to the interaction between light and free electrons of metal. SPP waveguide has unique features that are not available in ordinary optical waveguides, for example: the signals can be transmitted at nanometer scale; the signals are maintained in single polarization state in the long-distance transmission process, and therefore monomode transmissions can be implemented at various sizes; the metal core layer structure of SPP waveguide can transmit not only optical signals but also electrical signals, and therefore hybrid optical/electrical transmission can be implemented on the same chip; the dielectric constants of metal is complex number, wherein, the imaginary part represents the optical absorbing capability of the metal, therefore quick signal attenuation can be achieved with appropriate design of the metal core layer; the metal core layer of SPP waveguide can be directly modulated, so as to achieve efficient tuning of the SPP waveguide device. Thanks to these unique features of SPP waveguide, SPP waveguide devices play an important role in the optical communication and optical sensing field.

SUMMARY OF THE INVENTION

Technical Challenge

To overcome the drawbacks in the prior art, the present invention puts forward an integrated optical fiber gyroscope chip based on the interconnection structure of SPP waveguide and polymer optical waveguide, which utilizes SPP waveguide to achieve single polarization state of signal transmission, achieves controllable phase and splitting ratio by modulating the core layer of SPP waveguide, and designs a specific structure to eliminate optical leakage and thereby reduces the detection noise of the optical fiber gyroscope. The chip has advantages such as small size, low cost, high accuracy, and simple manufacturing process, etc.

Technical Scheme

The integrated optical fiber gyroscope chip based on SPP waveguide put forth in the present invention is obtained as follows:
from the input end to output end, the optical fiber gyroscope chip integrates an input waveguide, a third output waveguide, a directional coupler, a symmetrical triple-waveguides beam splitter, a first output waveguide, and a second output waveguide in sequence in the following position relation: the two ends of an upper branch waveguide of the directional coupler are connected with the input waveguide for the directional coupler and the input end of the middle branch waveguide of the symmetrical triple-waveguides beam splitter respectively, the two ends of a lower branch waveguide of the directional coupler are connected with the third output waveguide and a third metal nanowire respectively, the two ends of an upper branch waveguide of the symmetrical triple-waveguides beam splitter are connected with a first metal nanowire and the first output waveguide respectively, the two ends of a lower branch waveguide of the beam splitter are connected with a second metal nanowire and the second output waveguide respectively, a first modulation electrode, a second modulation electrode, a first metal wire gap, and a second metal wire gap are prepared on the coupling end of the upper branch waveguide of the beam splitter, a third modulation electrode, a fourth modulation electrode, a third metal wire gap, and a fourth metal wire gap are prepared on the output end of the lower branch waveguide of the beam splitter; wherein, the input waveguide, the first output waveguide, the second output waveguide, and the third output waveguide are polymer optical waveguides, the directional coupler and symmetrical triple-waveguides beam splitter are prepared from SPP waveguides, and the input waveguide, the first output waveguide, the second output waveguide, the third output waveguide, directional coupler, and symmetrical triple-waveguide beam splitter are prepared on the same substrate.

The input waveguide, first output waveguide, second output waveguide, and third output waveguide are composed of a substrate, a polymer core layer, an upper cladding, and a lower cladding, wherein, the core layer is made of organic polymer, with a thickness of several microns; the directional coupler and symmetrical triple-waveguides splitter are prepared from SPP waveguides and the SPP waveguides are composed of a substrate, a metal core layer, an upper cladding, and a lower cladding, wherein, the core layer is metal nanowire, which has a thickness of 10-20 nanometers and a width of 4-8 micrometers; the polymer optical waveguides and SPP waveguides are prepared on the same substrate, the upper cladding and lower cladding are made of organic polymer dielectric material, which has a thickness of 10-20 micrometers.

The polymer optical waveguides, which are used to prepare the input waveguide, first output waveguide, second output waveguide, and third output waveguide, and the SPP waveguides that are used to prepare the directional coupler and symmetrical triple-waveguides beam splitter form an interconnection structure between them, with the core layer of SPP waveguide located on the central plane of the core layer of polymer optical waveguide.

The optical circuit of the integrated optical fiber gyroscope put forth in the present invention is as follows: the optical source of the optical fiber gyroscope system is a super-luminescent light-emitting diode (SLD), the optical signal passes through an input optical fiber into the input waveguide, then it is transmitted to the directional coupler 2 interconnected with the input waveguide, and then enters into the symmetrical triple-waveguides beam splitter 3, where the optical signal is divide into two optical beams; the two optical beams respectively enter into the first output waveguide and second output waveguide interconnected with the beam splitter, and then are respectively coupled to the first output optical fiber and second output optical fiber; next, the optical beams enter into the first depolarizer and the second depolarizer respectively, and are transmitted into optical fiber coils and propagate in clockwise direction and counter clockwise direction; next, the two optical beams return along their optical paths respectively, converge at the symmetrical triple-waveguides beam splitter again to form interference; the interference beam is transmitted via the directional coupler to the third output waveguide, and then passes through the output optical fiber into an optical detector assembly, so as to detect the angular velocity.

Beneficial Effects

Compared to the prior art, the present invention has the following advantages:
1. The integrated optical fiber gyroscope chip put forth in the present invention utilizes the absorption characteristics of metal and the design of a novel structure to eliminate the influence of leak pattern on the accuracy of optical fiber gyroscope; in addition, the integrated optical fiber gyroscope utilizes the unique transmission characteristics of SPP waveguides to achieve polarization maintaining of optical signals during long-distance transmission, and thereby achieve mono-mode transmission in core layers with different widths. Compared to $LiNbO_3$ optical waveguide devices, the integrated optical fiber gyroscope chip has higher accuracy and better polarization maintaining capability.
2. The integrated optical fiber gyroscope chip put forth in the present invention employs the interconnection of SPP waveguides and polymer optical waveguides to transmit optical signal, and adjust the size of light spot by changing the width of core layer of SPP waveguide so as to achieve pattern matching and low-loss coupling between waveguides.
3. For the integrated optical fiber gyroscope chip put forth in the present invention, the directional coupler, symmetrical triple-waveguides beam splitter, and modulation electrodes can be prepared in once. Compared to the preparation of $LiNbO_3$ optical waveguide devices, the preparation process of the integrated optical fiber gyroscope chip is simplified, and the cost is lower, but the integration level of the optical system is increased; since phase modulation and intensity modulation can be directly performed for the core layer of SPP waveguide, the modulation efficiency is higher, and the stability is better.

Figure 1:
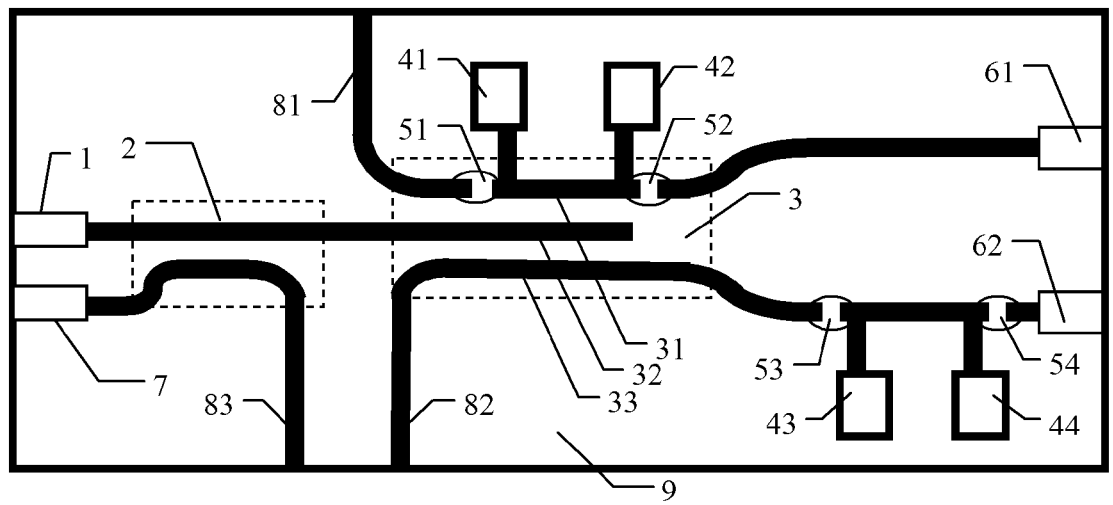
FIG. 1 is a schematic structural diagram of the integrated optical fiber gyroscope chip based on SPP waveguide.

| Brief Description of the reference numbers | |
|---|---|
| 1 Input waveguide | 2 Directional coupler |
| 3 Symmetrical triple-waveguides beam splitter | 31 Upper branch waveguide of beam splitter |
| 32 Middle branch waveguide of beam splitter | 33 Lower branch waveguide of beam splitter |
| 41 First modulation electrode | 42 Second modulation electrode |
| 43 Third modulation electrode | 44 Fourth modulation electrode |
| 51 First metal wire gap | 52 Second metal wire gap |
| 53 Third metal wire gap | 54 Fourth metal wire gap |
| 61 First output waveguide | 62 Second output waveguide |
| 7 Third output waveguide | 81 First metal nanowire |
| 82 Second metal nanowire | 83 Third metal nanowire |
| 9 Substrate | 10 Metal core layer |
| 11 Polymer core layer | 12 Upper cladding |
| 13 Lower cladding | 14 Super-luminescent light-emitting diode (SLD) |
| 151 Input optical fiber | 152 Output optical fiber |
| 161 First output optical fiber | 162 Second output optical fiber |
| 171 First depolarizer | 172 Second depolarizer |
| 18 Optical fiber coil | 19 Optical detector assembly |

EMBODIMENTS

SPPs are non-radioactive electromagnetic waves that propagate and are restrained on metal surface. SPPs are restraint on the waveguide surface because of the interaction between light and free electrons in the metal. SPP waveguides are metal optical waveguides based on SPPs. SPP waveguides are different from ordinary optical waveguides for the following reasons:

1. According to Maxwell's equations and its boundary conditions, only transverse magnetic (TM) mode can transmit perpendicularly to the boundary and produce SPPs by coupling and excitation, while transverse electric (TE) mode can't produce coupling and excitation phenomena. Therefore, SPP waveguide can maintain the single polarization of signals during long-distance transmission, and achieve mono-mode signal transmission with waveguides having various sizes. The integrated optical fiber gyroscope chip put forth in the present invention utilizes SPP waveguides to prepare directional coupler and symmetrical triple-waveguides beam splitter, to achieve single polarization of signal transmission in the integrated optical chip.
2. In the visible light region and near infrared region, the dielectric constant of a metal is complex number, and the wave vector of SPP is also complex number, wherein, the imaginary part of dielectric constant of metal decides the absorption property of metal, and the imaginary part of the wave vector of SPP decides the Ohm loss during SPP propagation. Therefore, the metal waveguide can absorb optical signals in the form of Ohm loss, without forming apparent leak pattern. In the integrated optical fiber gyroscope chip put forth in the present invention, with the design of width and thickness of metal nanowires 81, 82, and 83, SPP waveguide can be differentiated from transmission waveguide, and optical signal absorption can be enhanced.
3. Momentum matching and pattern matching must be satisfied so as to excite SPPs. Since the refractive index of the core layer of organic polymer waveguide is slightly higher than that of the metal core layer of SSP waveguide, momentum matching for optical signal transmission between the two types of waveguides can be satisfied, and direct coupling between SPP waveguide and polymer optical waveguide can be achieved to transmit optical signals. Since the size of light spot in SPP waveguide is closely related with the width of metal core layer, the size of light spot can be adjusted by changing the width of waveguide core layer to match the mode field of polymer optical waveguide, and thereby achieve low-loss connection between SPP waveguide and polymer optical waveguide.

Hereunder the technical scheme of the present invention will be further described, with reference to the accompanying drawings.

The structure of integrated optical fiber gyroscope chip based on SPP waveguide put forth in the present invention is shown in FIG. 1. As shown in FIG. 1, the integrated optical fiber gyroscope chip comprises an input waveguide 1, a directional coupler 2, a symmetrical triple-waveguides beam splitter 3, a first modulation electrode 41, a second modulation electrode 42, a third modulation electrode 43, a fourth modulation electrode 44, a first metal wire gap 51, a second metal wire gap 52, a third metal wire gap 53, a fourth metal wire gap 54, a first output waveguide 61, a second output waveguide 62, a third output waveguide 7, and a first metal nanowire 81, a second metal nanowire 82, and a third metal nanowire 83, wherein, the input waveguide 1, first output waveguide 61, second output waveguide 62, and third output waveguide 7 are composed of a substrate 9, a polymer core layer 11, an upper cladding 12, and a lower cladding 13; the directional coupler 2 and symmetrical triple-waveguides beam splitter 3 are prepared from SPP waveguides, and the SPP waveguides are composed of a substrate, a metal core layer 10, an upper cladding 12, and a lower cladding 13; the components of the integrated optical fiber gyroscope chip are located in the following position relation: two ends of an upper branch waveguide of the directional coupler 2 are connected with the input waveguide 1 and the input end of a middle branch waveguide 32 of the symmetrical triple-waveguides beam splitter 3 respectively, the two ends of a lower branch waveguide of the directional coupler 2 are respectively connected with the third output waveguide 7 and third metal nanowire 83, the two ends of an upper branch waveguide 31 of the symmetrical triple-waveguides beam splitter 3 are connected with the first metal nanowire 81 and the first output waveguide 61 respectively, and the two ends of a lower branch waveguide 33 of the beam splitter are connected with the second metal nanowire 82 and second output waveguide 62 respectively; the first modulation electrode 41, second modulation electrode 42, first metal wire gap 51, and second metal wire gap 52 are prepared on the coupling end of the upper branch waveguide 31 of the beam splitter, and the third modulation electrode 43, fourth modulation electrode 44, third metal wire gap 53, and fourth metal wire gap 54 are prepared on the output end of the lower branch waveguide 33 of the beam splitter; wherein, the input waveguide 1, first output waveguide 61, second output waveguide 62, and third output waveguide 7 are polymer optical waveguides, the directional coupler 2 and symmetrical triple-waveguides beam splitter 3 are prepared from SPP waveguides; the input waveguide 1, first output waveguide 61, second output waveguide 62, third output waveguide 7, directional coupler 2, and symmetrical triple-waveguides beam splitter 3 are prepared on the same substrate 9.

Wherein, the polymer optical waveguides and SPP waveguides form a waveguide interconnection structure between them, with the core layer 10 of SPP waveguide located on the central plane of the core layer 11 of polymer optical waveguide; the first modulation electrode 41, second modulation electrode 42, and metal in the first metal wire gap 51 and second metal wire gap 52 form a current circuit for intensity modulation of optical signals, while the third modulation electrode 43, fourth modulation electrode 44, and metal in the third metal wire gap 53 and fourth metal wire gap 54 form a current circuit for phase modulation of optical signals; to prevent occurrence of optical signal leak mode at each coupling hollow end during coupling process between the directional coupler 2 and the symmetrical triple-waveguides beam splitter 3, the first metal nanowire 81, second metal nanowire 82, and third metal nanowire 83 are designed to absorb optical signals at the coupling hollow end, so as to improve the accuracy of the optical gyroscope.

Figure 2:
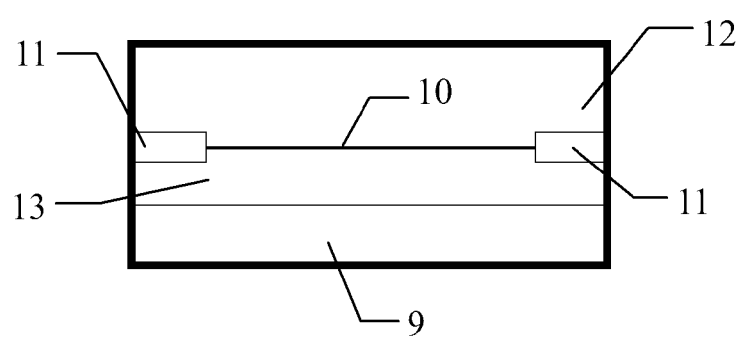
FIG. 2 is a schematic sectional view of the integrated optical fiber gyroscope chip based on SPP waveguide.

The input waveguide 1, first output waveguide 61, second output waveguide 62, and third output waveguide 7 are composed of a substrate 9, a polymer core layer 11, an upper cladding 12, and a lower cladding 13, wherein, the core layer is made of organic polymer having a thickness of several microns; the directional coupler 2 and symmetrical triple-waveguides beam splitter 3 are prepared from SPP waveguides, and the SPP waveguides comprise a substrate 9, a metal core layer 10, an upper cladding 12, and a lower cladding 13, wherein, the core layer is metal nanowire having a thickness of 10-20 nanometers and a width of 4-8 micrometers; the polymer optical waveguides and SPP waveguides are prepared on the same substrate 9, the upper cladding 12 and lower cladding 13 are made of organic polymer dielectric material, the thickness of the upper and lower cladding is 10-20 micrometers, as shown in FIG. 2.

Figure 3:
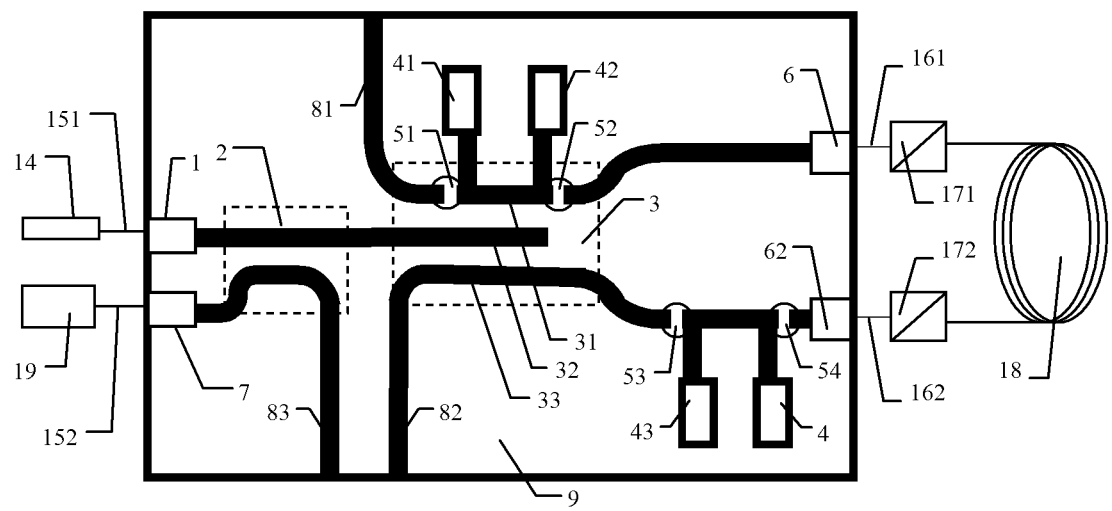
FIG. 3 is a schematic diagram of an optical gyroscope that adopts the integrated optical fiber gyroscope chip based on SPP waveguide.

The integrated optical fiber gyroscope chip put forth in the present invention is used in the optical fiber gyroscope field. An optical fiber gyroscope that utilizes the chip provided in the present invention is shown in FIG. 3. The optical circuit and the functions of each component are as follows: the optical source of the optical fiber gyroscope system is a super-luminescent light-emitting diode (SLD) 14, which is commonly used in optical fiber gyroscope. A SLD radiates lights with a short coherent length, can greatly reduce light scattering noise, and has enough output power; therefore is an ideal optical source for optical fiber gyroscope. The optical signal passes through an input optical fiber 8, into the input waveguide 1, then is transmitted to the directional coupler 2 interconnected with the input waveguide 1, and enters into the symmetrical triple-waveguides beam splitter 3; the symmetrical triple-waveguides beam splitter is prepared from SPP waveguide, and can achieve single polarization during long-distance signal transmission, and thereby improve the accuracy of the optical gyroscope. Voltage is applied across the first modulation electrode 41 and second modulation electrode 42 to implement intensity modulation for optical signal; voltage is applied across the third modulation electrode 43 and fourth modulation electrode 44 to implement phase modulation for optical signal; in this way, the optical beam is divide into two beams at 50:50 intensity ratio by the beam splitter, phase modulator, and intensity modulator; the two beams in the same phase respectively enter into the first output waveguide 61 and second output waveguide 62 interconnected with the beam splitter, and then are coupled to the first output optical fiber 161 and second output optical fiber 162 respectively; next, the two beams enter into a first depolarizer 171 and a second depolarizer 172, respectively, in which the polarization maintaining signal is depolarized. Utilizing two depolarizers technique not only the requirement for interchangeability of the optical fiber gyroscope system is met but also the polarization maintaining optical fiber coil can be replaced with an ordinary mono-mode optical fiber coil, and thereby the cost is reduced. The depolarized beams are transmitted into optical fiber coil 18, and then propagates in clockwise direction and counter clockwise direction in the coil respectively; then, they return along their optical paths, converge again in the symmetrical triple-waveguide beam splitter and form interference; next, the interference beam is transmitted via the directional coupler 2 to the third output waveguide 7. In each coupling process, the first metal nanowire 81, second metal nanowire 82, and third metal nanowire 83 absorb optical signals at the coupling hollow end, to eliminate the influence of leak mode on the accuracy of optical fiber gyroscope; finally, the optical signals reach the optical detector assembly 19 through an output optical fiber 152, to accomplish the detection of angular velocity.

The invention claimed is:

1. An integrated optical fiber gyroscope chip based on surface plasmon polariton (SSP) waveguide, wherein, it integrates the following components in sequence from the input end to output end: an input waveguide (1), a third output waveguide (7), a directional coupler (2), a symmetrical triple-waveguides beam splitter (3), a first output waveguide (61), and a second output waveguide (62), the components have the following position relation: the two ends of an upper branch waveguide of the directional coupler (2) are connected with the input waveguide (1) and the input end of a middle branch waveguide (32) of the symmetrical triple-waveguides beam splitter (3) respectively, the two ends of a lower branch waveguide of the directional coupler (2) are connected with the third output waveguide (7) and a third metal nanowire (83) respectively, the two ends of an upper branch waveguide (31) of the symmetrical triple-waveguides beam splitter (3) are connected with a first metal nanowire (81) and the first output waveguide (61) respectively, the two ends of a lower branch waveguide (33) of the beam splitter are connected with a second metal nanowire (82) and the second output waveguide (62) respectively, a first modulation electrode (41), a second modulation electrode (42), a first metal wire gap (51), and a second metal wire gap (52) are prepared on the coupling end of the upper branch waveguide (31) of the beam splitter, a third modulation electrode (43), a fourth modulation electrode (44), a third metal wire gap (53), and a fourth metal wire gap (54) are prepared on the output end of the lower branch waveguide (33) of the beam splitter; wherein, the input waveguide (1), first output waveguide (61), second output waveguide (62), and third output waveguide (7) are polymer optical waveguides, the directional coupler (2) and symmetrical triple-waveguide beam splitter (3) are prepared from SPP waveguide, and the input waveguide (1), first output waveguide (61), second output waveguide (62), third output waveguide (7), directional coupler (2), and symmetrical triple-waveguide beam splitter (3) are prepared on the same substrate (9).

2. The integrated optical fiber gyroscope chip based on surface plasmon polariton (SSP) waveguide according to claim 1, wherein, the input waveguide (1), first output waveguide (61), second output waveguide (62), and third output waveguide (7) are composed of a substrate (9), a polymer core layer (11), an upper cladding (12), and a lower cladding (13), wherein, the core layer is made of organic polymer having a thickness of several microns; the directional coupler (2) and symmetrical triple-waveguides beam splitter (3) are prepared from SPP waveguides, and the SPP waveguides comprise a substrate (9), a metal core layer (10), an upper cladding (12), and a lower cladding (13), wherein, the core layer is metal nanowire having a thickness of 10-20 nanometers and a width of 4-8 micrometers; the polymer optical waveguides and SPP waveguide are prepared on the same substrate (9), the upper cladding (12) and lower cladding (13) are made of organic polymer dielectric material, the thickness of upper and lower cladding is 10-20 micrometers.

3. The integrated optical fiber gyroscope chip based on surface plasmon polariton (SSP) waveguide according to claim 2, wherein, the polymer optical waveguide that are used to prepare the input waveguide (1), first output waveguide (61), second output waveguide (62), and third output waveguide (7) and the SPP waveguide that are used to prepare the directional coupler (2) and symmetrical triple-waveguides beam splitter (3) form an interconnection structure between them, with the core layer (10) of SPP waveguide located on the central plane of the core layer (11) of polymer optical waveguide.

* * * * *